US008407221B2

(12) United States Patent
Murthy et al.

(10) Patent No.: US 8,407,221 B2
(45) Date of Patent: Mar. 26, 2013

(54) GENERALIZED NOTION OF SIMILARITIES BETWEEN UNCERTAIN TIME SERIES

(75) Inventors: Karin Murthy, Bangalore (IN); Smruti Ranjan Sarangi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 12/833,055

(22) Filed: Jul. 9, 2010

(65) Prior Publication Data
US 2012/0011155 A1    Jan. 12, 2012

(51) Int. Cl.
G06F 17/30 (2006.01)
(52) U.S. Cl. ........ 707/736; 707/737; 707/749; 707/752; 707/754; 707/776; 702/176
(58) Field of Classification Search .................. 707/703, 707/736, 737, 752, 754, 749, 776; 702/176
See application file for complete search history.

(56) References Cited

U.S. PATENT DOCUMENTS

| | | | | |
|---|---|---|---|---|
| 5,822,728 A * | 10/1998 | Applebaum et al. | .......... | 704/254 |
| 6,400,853 B1 * | 6/2002 | Shiiyama | ...................... | 382/305 |
| 6,526,405 B1 * | 2/2003 | Mannila et al. | ............... | 719/318 |
| 6,673,549 B1 * | 1/2004 | Furness et al. | ............... | 435/6.14 |
| 7,617,010 B2 * | 11/2009 | Bocharov et al. | ............... | 700/29 |
| 7,711,734 B2 * | 5/2010 | Leonard | ........................ | 707/736 |
| 7,880,749 B2 * | 2/2011 | Favart et al. | ................... | 345/619 |
| 7,933,740 B2 * | 4/2011 | Castelli et al. | ................ | 702/176 |
| 7,996,073 B2 * | 8/2011 | Busche et al. | ................ | 600/513 |
| 2003/0074251 A1 * | 4/2003 | Kumar et al. | ................... | 705/10 |
| 2003/0165924 A1 * | 9/2003 | Shiffman et al. | ................. | 435/6 |
| 2005/0102272 A1 * | 5/2005 | Kumar et al. | ..................... | 707/2 |
| 2006/0100969 A1 * | 5/2006 | Wang et al. | .................... | 705/400 |
| 2006/0224356 A1 * | 10/2006 | Castelli et al. | ................ | 702/176 |
| 2007/0239753 A1 * | 10/2007 | Leonard | ........................ | 707/101 |
| 2007/0292002 A1 * | 12/2007 | Kaplan | ........................ | 382/119 |
| 2008/0235222 A1 * | 9/2008 | Mojsilovic | ........................ | 707/6 |
| 2008/0275671 A1 * | 11/2008 | Castelli et al. | ................ | 702/176 |
| 2008/0294651 A1 * | 11/2008 | Masuyama et al. | ........... | 707/100 |
| 2009/0006365 A1 * | 1/2009 | Liu et al. | ........................... | 707/5 |
| 2009/0083195 A1 * | 3/2009 | Aymeloglu et al. | ......... | 705/36 R |
| 2009/0216611 A1 * | 8/2009 | Leonard et al. | ................. | 705/10 |
| 2010/0324436 A1 * | 12/2010 | Moorman et al. | ............ | 600/515 |
| 2011/0153601 A1 * | 6/2011 | Nakazawa et al. | ............ | 707/723 |

OTHER PUBLICATIONS

International Searching Authority, Search Report for International Application PCT/EP2011/061630, Jul. 9, 2012 (EPO), 4 pages.
Sarangi, Smruti R., "Dust: A Generalized Notion of Similarity between Uncertain Time Series", KDD'10, Jul. 25, 2010, 10 pages, XP055028828, retrieved from the Internet: URL:http://www.cse.iitd.ernet.in/~srsarangi/files/papers/dust.pdf (retrieved on Jun. 4, 2012), Washington, DC, USA.
Kumar, Mahesh, "Clustering seasonality patterns in the presence of errors", KDD'02, Jul. 26, 2002, pp. 557-563, XP055028659, retrieved from the Internet: URL:http://delivery.acm.org/10.1145/780000/775129/p557-kumar.pdf?ip=145.64.134.242
&acc=ACTIVE (retrieved on May 31, 2012), Edmonton, Alberta, Canada.

(Continued)

Primary Examiner — Thanh-Ha Dang
(74) Attorney, Agent, or Firm — Ference & Associates, LLC

(57) ABSTRACT

Embodiments of the invention related to a method and system for finding a distance between a plurality of time series, wherein each individual time series in the plurality of time series including a data, wherein the data is uncertain, and using such distance computed in business applications.

18 Claims, 5 Drawing Sheets

OTHER PUBLICATIONS

Taylor, John R., An Introduction to Error Analysis. The Study of Uncertainties in Physical Measurements. Second Edition, Aug. 1, 1996, pp. 286-293, XP055032113, University Science Books, ISBN: 978-0-93-570275-0.

Warren, Liao, et. al., "Clustering of time series data-a survey", Pattern Recognition, Nov. 11, 2005, pp. 1857-1874, vol. 38, No. 11, XP027610890, Elsevier, GB Lin, Jessica, "A Symbolic Representation of Time Series, with Implications for Streaming Algorithms", Jun. 6, 2003, 10 pages. XP055028285, retrieved from the Internet: URS:http//www.abdn.ac.uk/~csc242/teaching/CS4031/information/SAX.pdf.

Kumar, et. al., "Clustering data with measurement errors", Computational Statistics and data analysis, Jul. 31, 2007, pp. 6084-6101, vol. 51, No. 12, XP022181627, ISSN: 0167-9473, North-Holland, Amsterdam, NL.

Aggarwal, C. C., et al., "A Survey of Uncertain Data Algorithms and Applications", IEEE Transactions on Knowledge and Data Engineering, May 1, 2009, pp. 609-623, vol. 21, No. 5, IEEE Service Center, ISSN: 1041-4347, Los Alamitos, California, USA.

\* cited by examiner

GENERALIZED NOTION OF SIMILARITIES BETWEEN UNCERTAIN TIME SERIES

BACKGROUND

Distance measures used for similarity search and data mining are often focused towards data without uncertainty. However, recently there has been a move to acknowledge that in many application domains, data is uncertain and the uncertainty has to be captured and accounted for. However, not many approaches deal with time series or streaming data.

SUMMARY

Embodiment of the invention relates generally to a method, a system and a computer program product for finding a distance between a plurality of time series, wherein each individual time series in the plurality of time series including a data, wherein the data represents data values, and wherein the data values of the time series are uncertain. At least two time series from a plurality of time series are selected. A difference value between the two series at a given instant of time is computed and a mapping is made between the computed difference value with a table of values. A new difference value using the table of values is computed and using the difference value a distance value is computed, wherein the distance value is a measure of similarity between the time series. The new computed distance value is provided as input for example advantageously for data mining tasks that can be associated with other time series. Other embodiments are also disclosed.

BRIEF DESCRIPTION OF THE DRAWINGS

Embodiments of the invention will best be understood by reference to the following detailed description of an illustrative embodiment when read in conjunction with the accompanying drawings, wherein like reference numerals indicate like components, where features shown in the drawing are meant as illustrative of only some embodiments of the invention, and not of all embodiments of the invention, unless otherwise explicitly indicated, and implications to the contrary are otherwise not to be made, and in the drawings:

FIG. 1 is an exemplary embodiment of a data processing system, such as a computer system, which includes at least a processor and memory, on which the general embodiments illustrated in FIGS. 2 to 5 may be implemented on.

DETAILED DESCRIPTION

Figure 1:
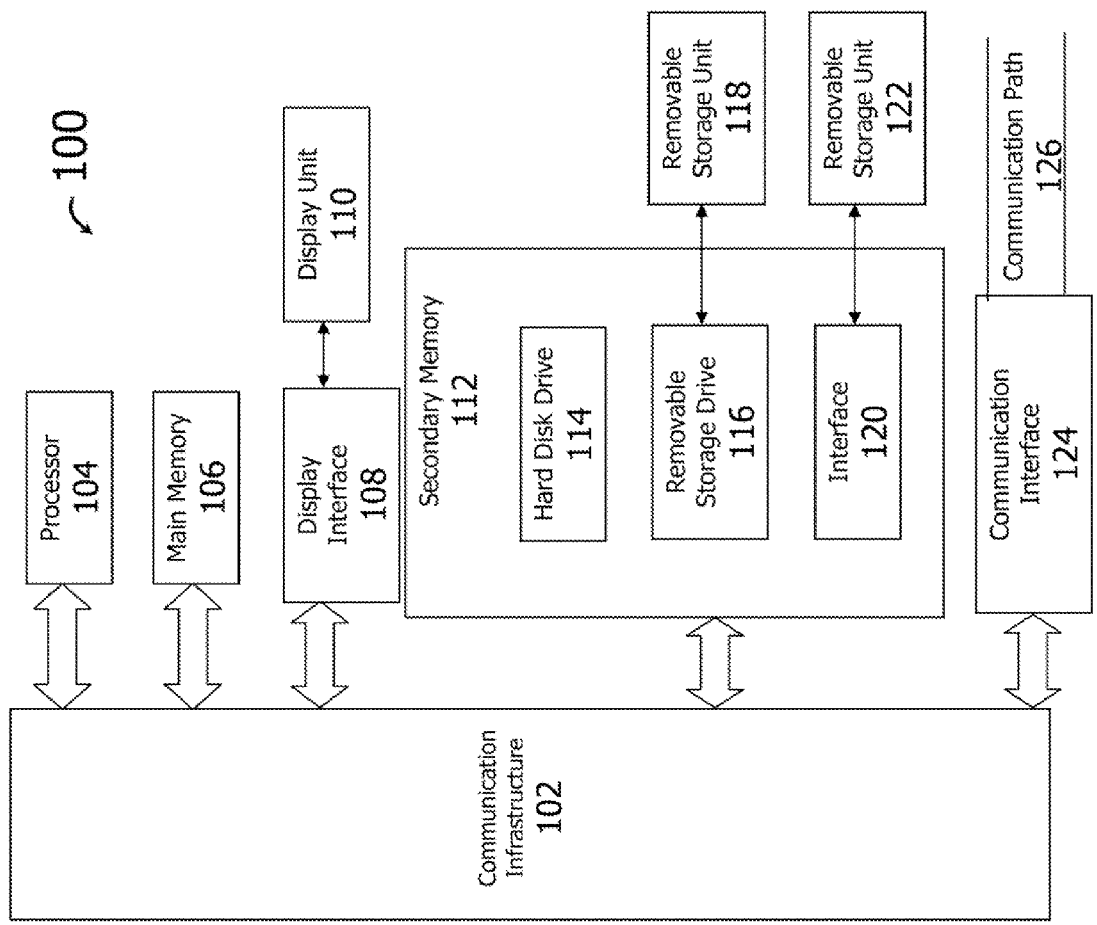

Where reference is made in any one or more of the accompanying drawings to steps and/or features, which have the same reference numerals, those steps and/or features have for the purposes of this description the same function(s) or operation(s), unless the contrary intention appears.

"Computer" or "data processing system" means any device capable of performing the methods, producing compressed bitmaps as described herein, or performing logical comparisons between a plurality of compressed bitmaps, and compressed and uncompressed bitmaps, as disclosed herein, including but not limited to: a microprocessor, a microcontroller, a digital state machine, a field programmable gate array (FGPA), a digital signal processor, a collocated integrated memory system with microprocessor and analog or digital output device, a distributed memory system with microprocessor and analog or digital output device connected by digital or analog signal protocols.

"Computer readable media" means any source of organized information that may be processed by a computer to perform the steps described herein to result in, store, perform logical operations upon, or transmit, a Word Aligned Hybrid compressed bitmap, including but not limited to: a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FGPAs), flash random access memory (flash RAM); and remotely transmitted information by electromagnetic or optical methods including, but not limited to, wireless transmission, copper wires, and optical fibers.

A computer-readable medium of an embodiment of the invention has one or more computer programs stored thereon to execute a method. The computer-readable medium may be a recordable data storage medium, or another type of tangible computer-readable medium. The method determines whether one or more first processors have a first task utilization rate that is less than a threshold. The first processors have one or more first tasks partially bound thereto such that by default the first processors execute the first tasks. The first task utilization rate is a utilization rate of the first processors in executing the first tasks. In response to determining that the first task utilization rate is less than the threshold, the method causes one or more first tasks that have migrated to a second processor group to migrate back to first processor group. If that it is not possible, then one or more second tasks currently being executed on one or more second processors are caused to migrate to the first processors, such that the first processors execute the second tasks.

A computer-readable medium of another embodiment of the invention also has one or more computer programs stored thereon to execute a method. The computer-readable medium may be a recordable data storage medium, or another type of tangible computer-readable medium. The method determines whether one or more first processors have a second task utilization rate that is less than a threshold. The first processors have one or more first tasks partially bound thereto such that by default the first processors execute the first tasks. The first processors are currently executing one or more second tasks that have been migrated to the first processors and that are not partially bound to the first processors. The second task utilization rate is a utilization rate of the first processors in executing the second tasks. In response to determining that the second task utilization rate is less than the threshold, the method causes the second tasks currently being executed on the first processors to migrate to one or more second processors, such that the second processors execute the second tasks.

FIG. 1 shows a detailed schematic of a data processing system, hereinafter referred to as a computer system, used implementing the exemplary data flow embodiments as illustrated in FIG. 2 to FIG. 5. The computer system 100 includes at least a processor 104. It should be understood although FIG. 1 illustrates a single processor, one skilled in the art would appreciate that more than one processor can be included as needed. The processor 104 is connected to a communication infrastructure 102 (for example, a communications bus, cross-over bar, or network) where the communication infrastructure 104 is configured to facilitate communication between various elements of the exemplary computer system 100. Various software embodiments are described in terms of this exemplary computer system. After reading this description, it will become apparent to a person of ordinary skill in the relevant art(s) how to implement the invention using other computer systems and/or computer architectures.

Exemplary computer system 100 can include a display interface 108 configured to forward graphics, text, and other data from the communication infrastructure 102 (or from a frame buffer not shown) for display on a display unit 110. The computer system 100 also includes a main memory 106, which can be random access memory (RAM), and may also include a secondary memory 112. The secondary memory 112 may include, for example, a hard disk drive 114 and/or a removable storage drive 116, representing a floppy disk drive, a magnetic tape drive, an optical disk drive, etc. The removable storage drive 116 reads from and/or writes to a removable storage unit 118 in a manner well known to those having ordinary skill in the art. The removable storage unit 118, represents, for example, a floppy disk, magnetic tape, optical disk, etc. which is read by and written to by the removable storage drive 116. As will be appreciated, the removable storage unit 118 includes a computer usable storage medium having stored therein computer software and/or data.

In exemplary embodiments, the secondary memory 112 may include other similar means for allowing computer programs or other instructions to be loaded into the computer system. Such means may include, for example, a removable storage unit 122 and an interface 120. Examples of such may include a program cartridge and cartridge interface (such as that found in video game devices), a removable memory chip (such as an EPROM, or PROM) and associated socket, and other removable storage units 122 and interfaces 120 which allow software and data to be transferred from the removable storage unit 122 to the computer system 100.

The computer system 100 may also include a communications interface 124. The communications interface 124 allows software and data to be transferred between the computer system and external devices. Examples of the communications interface 124 may include a modem, a network interface (such as an Ethernet card), a communications port, a PCM-CIA slot and card, etc. Software and data transferred via the communications interface 124 are in the form of signals which may be, for example, electronic, electromagnetic, optical, or other signals capable of being received by communications interface 124. These signals are provided to the communications interface 124 via a communications path (that is, channel) 126. The channel 126 carries signals and may be implemented using wire or cable, fiber optics, a phone line, a cellular phone link, an RF link, and/or other communications channels.

With reference to the embodiments disclosed, the terms "computer program medium," "computer usable medium," and "computer readable medium" are used to generally refer to media such as the main memory 106 and the secondary memory 112, the removable storage drive 116, a hard disk installed in the hard disk drive 114, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network that allows a computer to read such such computer readable information.

Computer programs (also referred to herein as computer control logic) are stored in the main memory 106 and/or the secondary memory 112. Computer programs may also be received via the communications interface 124. Such computer programs, when executed, can enable the computer system to perform the features of exemplary embodiments of the present invention as discussed herein. In particular, the computer programs, when executed, enable the processor 104 to perform the features of the computer system 100. Accordingly, such computer programs represent controllers of the computer system.

The embodiments disclosed above may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc.

The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

A system of an embodiment of the invention includes processors and a computer-readable medium. The processors are organized into processor groups. Each processor group has one or more of the processors assigned thereto. The computer-readable medium is to store a list of native tasks, a list of foreign tasks, and a list of migrated tasks for each processor group. The native tasks are those tasks that have been partially bound to the processor group, such that by default the processors of the processor group execute the native tasks. It is noted that the native task list does not contain tasks present in the migrated task list. The foreign tasks are those tasks that have been partially bound to a different processor group but that have been temporarily migrated to the processor group such that the processors of the processor group temporarily execute the foreign tasks. The migrated tasks are native tasks of the processor group that have been temporarily migrated away from the processor group to a different processor group such that the processors of the different processor group temporarily execute the migrated tasks.

Figure 2:
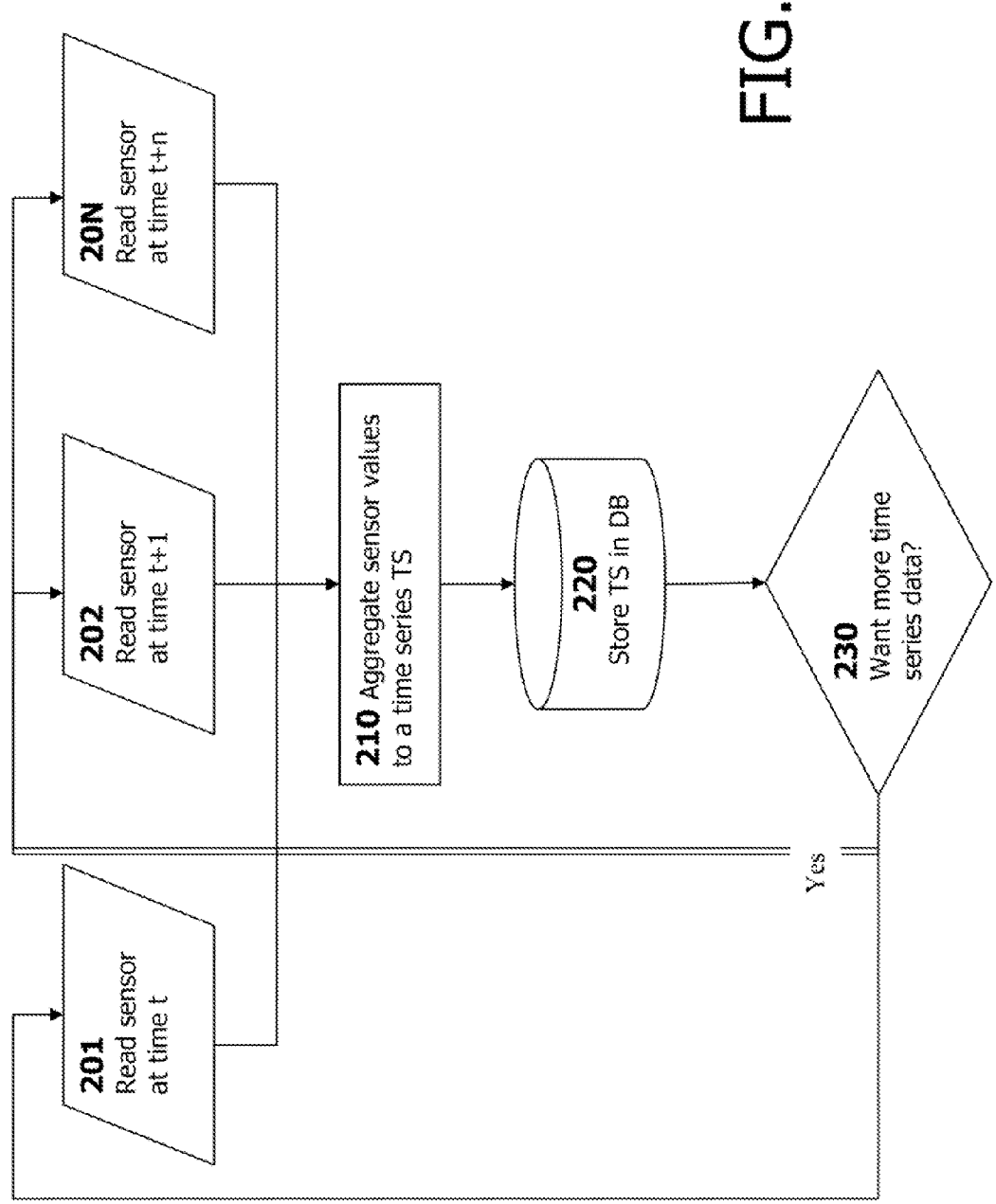
FIG. 2 is an exemplary embodiment of a typical sensor network setting and a method of gathering data from a plurality of sensors according to a general embodiment of the invention.

Reference is now made to FIG. 2, which illustrates an exemplary embodiment of a typical sensor network setting and a method for gathering data from a plurality of sensors according to a general embodiment of the invention. Typical sensors 201 . . . 20N, where N is an integer, illustrate a network setting of a plurality of sensors in a network coupled to a database. There are multiple sensors 201 . . . 20N and hence if each of the sensors produces sensor values, for example these sensor values or data values can be recorded as a time series, with a multiple sensor network, multiple sensor values are produced. The sensor values that are produced by the sensors are aggregated to a time series at step 210, preferably by time or by location of the sensors in the network. In step 220, the various time series that are collected for the plurality of sensors may be stored in a repository. In step 230, if additional time series data is required, a request may be made to the sensors or the sensors may be programmed to periodically send in sensor values, which can be aggregated and then stored in the repository.

Figure 3:
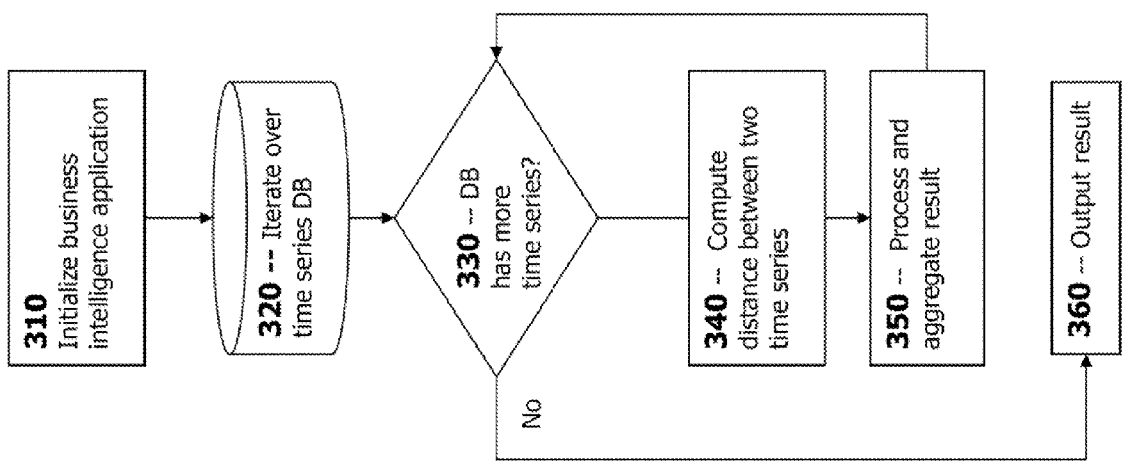
FIG. 3 is an exemplary embodiment of a flowchart of a method according to a general embodiment of the invention.

FIG. 3 is an exemplary embodiment of a flowchart of a method according to a general embodiment of the invention. FIG. 3 illustrates a typical flow for any business intelligence application which will use the time series data produced by sensors. In step 310, the business application is first initialized. In step 320, the application is configured to iterate over the time series data available in the repository. In step 330, a check is made to determine if there is any additional times series data in the repository. If there is no additional data, the output 360 is provided to a user. If there is additional time series data available in the repository, in step 340, at least two time series data is selected from the plurality of times series data in the repository and a distance between the two time series data is computed. In step 350, the computed distances as results are processed and aggregated, and in step 360, the output is provided to the user. Most business intelligence applications for time series data iterate over a database of time series (step 320) and compute distances between two time series (step 340). Examples of such business intelligence applications include classification, k-nearest-neighbor search, and motif detection.

Figure 4:
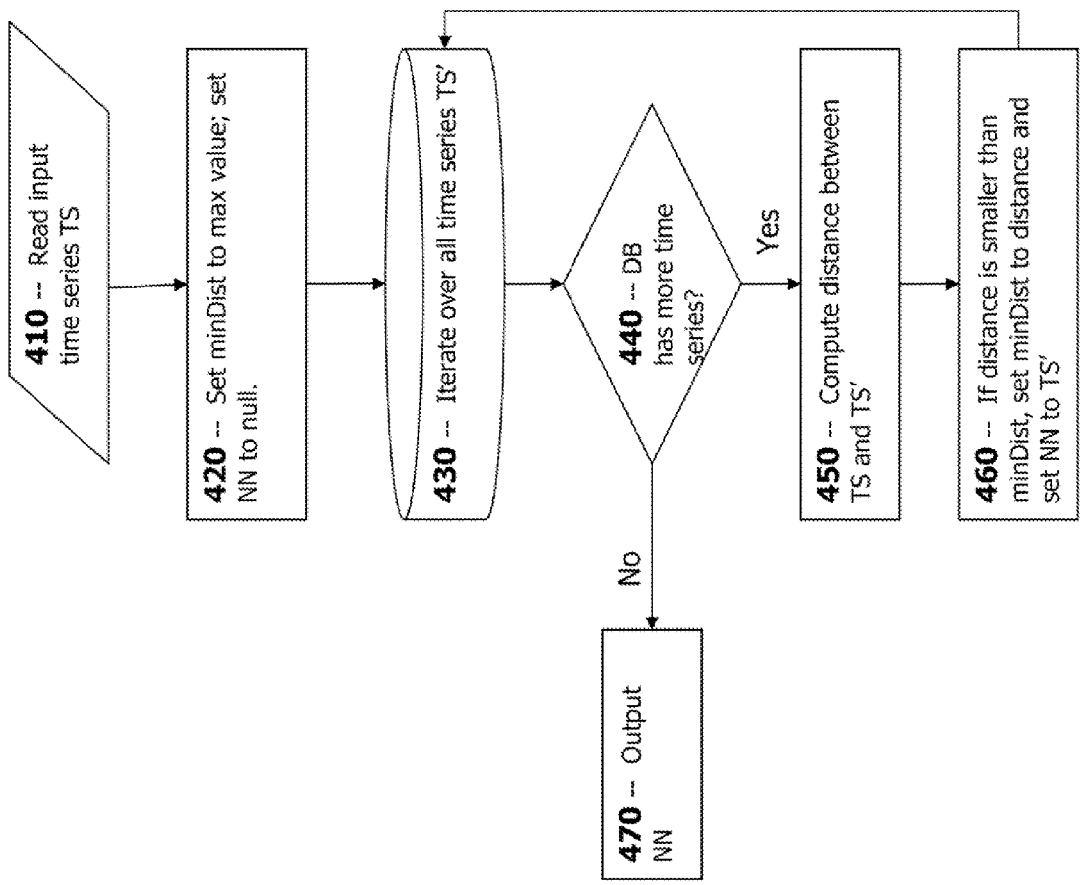
FIG. 4 is an exemplary embodiment of a flowchart of a method according to a general embodiment of the invention.

FIG. 4 is an exemplary embodiment of a flowchart of a method according to a general embodiment of the invention, which illustrates an example workflow for nearest-neighbor search on time-series data. In step 410, read the input time series (TS) for which the nearest neighbor (that is the time series TS' with the smallest distance to TS) is to be found. In step 420, the minimum distance is set to a maximum value and the result variable NN that will in the end hold the nearest neighbor of TS is set to null. In step 430, iteration is performed over all the time series (TS'), where time series TS is the time series for which the nearest neighbor is to be found and TS' successively takes the value of all other time series. In step 440 a check is made to determine if there are any additional time series in the repository. If there aren't any new time series, then in step 470 the nearest neighbor NN is output. If there are additional new time series in the repository, in step 450, the distance between the time series TS and TS' is computed and in step 460, if the distance is smaller than the minimum distance, then the distance is set as the minimum distance and the nearest neighbor NN is set to TS'.

Figure 5:
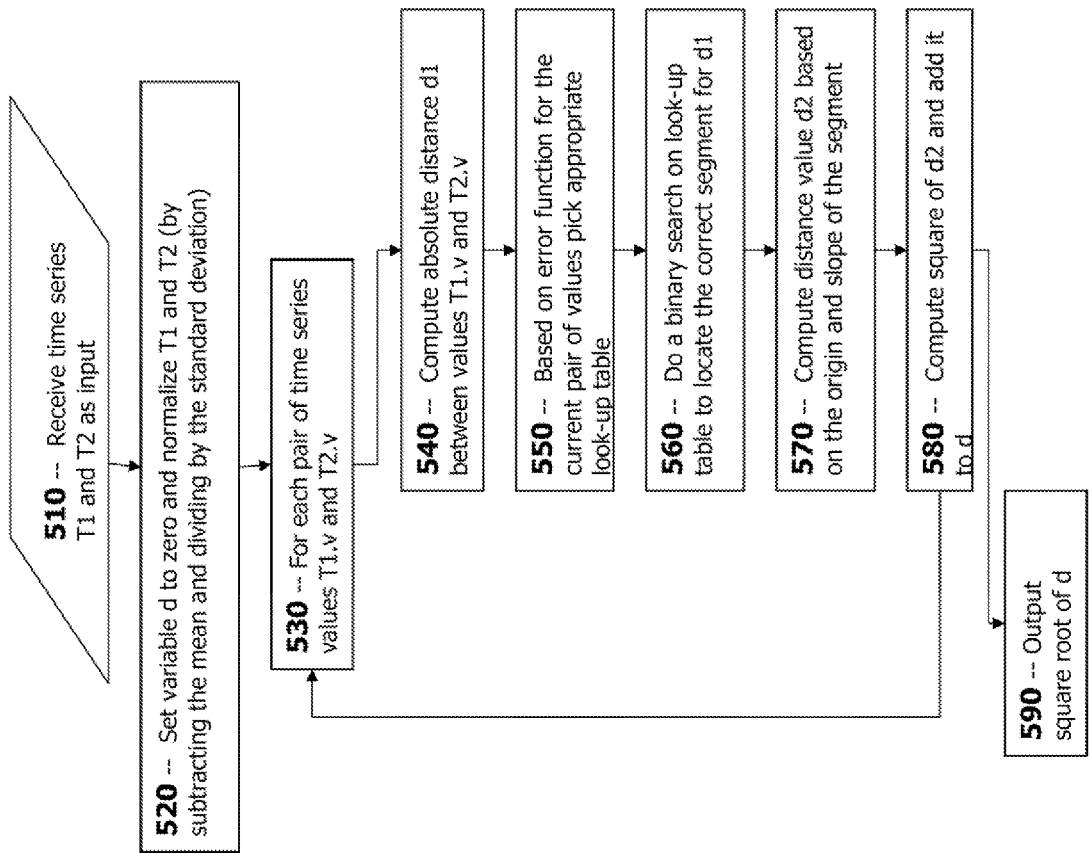
FIG. 5 is an exemplary embodiment of a flowchart of a method according to a general embodiment of the invention.

FIG. 5 is an exemplary embodiment of a flowchart of a method according to a general embodiment of the invention. FIG. 5 shown is based on a modification of the Euclidean distance, but can also be used in conjunction with the Dynamic Time Warping (DTW) distance. In step 510 the time series T1 and T2 are received as input. In step 520, the distance d is set to zero and the time series T1 and T2 are normalized. In step 530, a data value at a given instant of time in the time series is selected. For each pair of time series this data value is represented as T1.v and T2.v. In step 540, a distance d1 between the two data values of T1.v and T2.v is computed. In 550, based on the error function chosen for the current pair of data values, an appropriate look-up table is selected. In step 560, a binary search is performed on the look-up table to locate the correct segment of d1 in the look-up table. Once d1 is determined from the look-up table, in step 570, a distance value d2 is computed based on the origin and slope of the segment. In step 580, compute the square of d2 and add the computed square of d2 to the distance d. In step 590, the square root of d is computed and provided to the user.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Computer program or computer program in the present context means any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the invention.

What is claimed is:

1. A method, executed by one or more processors, for finding a distance between a plurality of time series, each individual time series in the plurality of time series including data, wherein the data are uncertain, the method comprising:
    selecting at least two time series from a plurality of time series;
    computing a difference value between the two series at a given instant of time;
    mapping the computed difference value with a lookup table of values; and
    using the lookup table of values to compute a distance value, wherein the distance value is a measure of similarity between the time series;
    said computing of a distance value comprising providing the computed difference value as input to the lookup table, locating a segment of the computed difference value in the lookup table and computing the distance value based on at least one property of the segment;
    the at least one property comprising at least one of: an origin of the segment, and a slope of the segment.

2. The method as claimed in claim 1, further comprising providing as input the distance value for data mining tasks associated with any other time series.

3. The method as claimed in claim 1, wherein computing the difference value comprises computing the difference between a first data value from the first time series and the second data value from the second time series.

4. The method as claimed in claim 3, wherein the difference value is computed for multiple pairs of first data value in the first time series and second data value in the second time series.

5. The method as claimed in claim 4, wherein the first data value in the first time series and the second data value in the second time series always occur at the same instant of time.

6. The method as claimed in claim 1, wherein the look-up table is dynamically generated using a transcendental function.

7. The method as claimed in claim 1, wherein the plurality of time series is stored in a repository.

8. The method as claimed in claim 7, wherein based on the error function an appropriate table of values is assigned.

9. The method as claimed in claim 1, further comprising determining an error function relative to the first and second data values.

10. A data processing system comprising at least a processor and a memory, the data processing system configured for finding a distance between a plurality of time series, each individual time series in the plurality of time series including data, wherein the data are uncertain, the data processing system being configured for:
    selecting at least two time series from a plurality of time series;
    computing a difference value between the two series at a given instant of time;
    mapping the computed difference value with a lookup table of values; and
    using the lookup table of values to compute a distance value, wherein the distance value is a measure of similarity between the time series;
    said computing of a distance value comprising providing the computed difference value as input to the lookup table, locating a segment of the computed difference value in the lookup table and computing the distance value based on at least one property of the segment;
    the at least one property comprising at least one of: an origin of the segment, and a slope of the segment.

11. The data processing system as claimed in claim 10, further comprising providing as input the distance value for data mining tasks associated with any other time series.

12. The data processing system as claimed in claim 10, wherein computing the difference value comprises computing the difference between a first data value from the first time series and the second data value from the second time series.

13. The data processing system as claimed in claim 12, wherein the difference value is computed for multiple pairs of first data value in the first time series and second data value in the second time series.

14. The data processing system as claimed in claim 13, wherein the first data value in the first time series and the second data value in the second time series always occur at the same instant of time.

15. The data processing system as claimed in claim 10, wherein the look-up table is dynamically generated using a transcendental function.

16. The data processing system as claimed in claim 10, wherein the plurality of time series is stored in a repository.

17. The data processing system as claimed in claim 16, wherein based on the error function an appropriate table of values is assigned.

18. The data processing system as claimed in claim 10, further comprising determining an error function relative to the first and second data values.

* * * * *